United States Patent
Nakagawa

(10) Patent No.: US 7,316,255 B2
(45) Date of Patent: Jan. 8, 2008

(54) PNEUMATIC TIRE AND METHOD OF MANUFACTURING THE SAME

(75) Inventor: Yoshiki Nakagawa, Kobe (JP)

(73) Assignee: Sumitomo Rubber Industries Ltd., Kobe-shi (JP)

( * ) Notice: Subject to any disclaimer, the term of this patent is extended or adjusted under 35 U.S.C. 154(b) by 325 days.

(21) Appl. No.: 11/027,943

(22) Filed: Jan. 4, 2005

(65) Prior Publication Data

US 2005/0161141 A1    Jul. 28, 2005

(30) Foreign Application Priority Data

Jan. 28, 2004    (JP) ............................. 2004-020224

(51) Int. Cl.
*B60C 15/06*    (2006.01)
*B29D 30/32*    (2006.01)

(52) U.S. Cl. .................... 152/541; 152/546; 152/547; 152/555; 156/132; 156/133; 156/135

(58) Field of Classification Search ............. 152/541, 152/546, 547, 555, 552, 554; 156/131, 132, 156/133, 135
See application file for complete search history.

(56) References Cited

U.S. PATENT DOCUMENTS

| | | | |
|---|---|---|---|
| 4,214,620 A | | 7/1980 | Mezzanotte |
| 4,326,576 A | * | 4/1982 | Mizumoto et al. .......... 152/541 |
| 4,872,497 A | * | 10/1989 | Hanada et al. .............. 152/541 |
| 5,522,443 A | * | 6/1996 | Ueyoko et al. ............. 152/542 |
| 5,620,539 A | * | 4/1997 | Ide ............................ 152/541 |
| 6,053,229 A | | 4/2000 | Suzuki |
| 6,371,185 B1 | * | 4/2002 | Suzuki ....................... 152/546 |
| 6,972,061 B1 | * | 12/2005 | Kubinski et al. ......... 156/110.1 |
| 2005/0028920 A1 | * | 2/2005 | Roedseth et al. ........... 156/132 |

FOREIGN PATENT DOCUMENTS

| | | |
|---|---|---|
| EP | 0 887 210 A2 | 12/1998 |
| EP | 0 887 210 A3 | 12/1998 |
| EP | 1 083 064 A2 | 3/2001 |
| EP | 1 083 064 A3 | 3/2001 |
| JP | 55-148603 A * 11/1980 | ................. 152/541 |
| JP | 11-20424 A | 1/1999 |
| JP | 3332330 B2 | 7/2002 |

\* cited by examiner

*Primary Examiner*—Geoffrey L. Knable
(74) *Attorney, Agent, or Firm*—Birch, Stewart, Kolasch & Birch, LLP

(57) ABSTRACT

A pneumatic tire comprises: a carcass ply turned up around a bead core in each bead portion from the inside to the outside of the tire so as to form a pair of turnup portions and a main portion therebetween; a bead apex disposed between the carcass ply turnup portion and main portion; and a reinforcing rubber layer disposed axially outside the carcass ply, wherein the bead apex extends radially outwardly from the bead core up to a position at a radial height in a range of from 10 to 25 mm from the radially outer end of the bead core; the reinforcing rubber layer extends radially outwardly beyond the maximum tire section width point, and radially inwardly beyond the radially outer edge of the turnup portion; and the bead apex and reinforcing rubber layer are each made of a hard rubber, and the difference in hardness therebetween is not more than 15 degrees. In a method of manufacturing the pneumatic tire, a bead-core-and-apex assembly is placed on each sides of a cylindrical surface of a tire-building drum around which a carcass ply is wound, wherein the radially outer end of a bead apex rubber of the assembly is positioned at a radial distance of not more than 8 mm from the cylindrical surface.

6 Claims, 5 Drawing Sheets

PNEUMATIC TIRE AND METHOD OF MANUFACTURING THE SAME

The present invention relates to a method of manufacturing a pneumatic tire, more particularly to a bead-and-lower-sidewall structure suitable for a light weight tire such as passenger car tire.

In general, a pneumatic tire is provided with a bead apex (d) as shown in FIG. 4. The bead apex (d) is made of a hard rubber and disposed between a main portion (b1) and a turnup portion (b2) of a carcass ply (b). The bead apex (d) extends from the bead core (c) into the sidewall portion to reinforce a bead portion (a) for the purpose of steering stability and the like.

In a method of building a green tire in which, as shown in FIG. 5, a radially extending bead apex rubber (d) is placed on each side of the tire-building drum (e), the radially outer part is folded around the tire-building drum (e) and then the edge (b2) of the carcass ply (b) is turned up. As a result, due to the deep bent, even in the finished vulcanized tire, the bead apex (d) tends to have a residual internal stress which is so large as to decrease the strength. Thus, to increase the strength, the bead apex has to increase its rubber volume. This is not preferable in view of weight reduction and because such a big bead apex rubber is difficult to fold orderly.

In the laid-open Japanese patent application JP-A-11-20424, on the other hand, in order to eliminate the need for folding of the large bead apex, as shown in FIGS. 6(a) and 6(b), a small bead apex (d) is used, and in order to provide steering stability, instead of the radially outer portion of the large bead apex, a separate reinforcing rubber layer (f) is disposed between the main portion (b1) and a turnup portion (b2) of a carcass ply (b). In this case, therefore, during building a green tire, the reinforcing rubber layer (f) is wound on the carcass ply main portion around the drum as shown in FIG. 6(a), and then the carcass ply (b) is turned up. Thereafter, the cylindrical assembly including the carcass ply and reinforcing rubber layer is swollen into a toroidal shape. During swelling, however, as the reinforcing rubber layer (f) is stretched, the carcass cords are very likely to be disarranged in the turnup portion (b2) and the adjacent main portion (b1) of the carcass ply.

It is therefore, an object of the present invention to provide a pneumatic tire and a method of manufacturing the same in which, by using a small bead apex rubber and a separate reinforcing rubber layer instead of a single large bead apex, while providing necessary steering stability and achieving an effective weight reduction, the above-mentioned problems are solved, namely, the deterioration in strength due to the residual internal stress can be avoided, and the disarrangement of the carcass cords during building a green tire can be prevented to improve tire uniformity.

According to the present invention, a pneumatic tire comprises: a carcass ply turned up around a bead core in each bead portion from the inside to the outside of the tire so as to form a pair of turnup portions and a main portion therebetween; a bead apex disposed between the carcass ply turnup portion and main portion; and a reinforcing rubber layer disposed axially outside the carcass ply, wherein the bead apex extends radially outwardly from the bead core up to a position at a radial height in a range of from 10 to 25 mm from the radially outer end of the bead core; the reinforcing rubber layer extends radially outwardly beyond the maximum tire section width point, and radially inwardly beyond the radially outer edge of the turnup portion; and the bead apex and reinforcing rubber layer are each made of a hard rubber, and the difference in hardness therebetween is not more than 15 degrees.

In a method of manufacturing the pneumatic tire according to the present invention, a bead-core-and-apex assembly is placed on each sides of a cylindrical surface of a tire-building drum around which a carcass ply is wound, and at this moment, the radially outer end of a bead apex rubber of the assembly is positioned at a radial distance of not more than 8 mm from the cylindrical surface.

In this application, various dimensions of the finished tire refer to those under the normally inflated unloaded state unless otherwise noted.

Here, the normally inflated unloaded state is such that the tire is mounted on a standard wheel rim and inflate to a standard pressure but loaded with no tire load. The standard wheel rim is a wheel rim officially approved for the tire by standard organization, i.e. JATMA (Japan and Asia), T&RA (North America), ETRTO (Europe), STRO (Scandinavia) and the like. The standard pressure and a standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

Embodiments of the present invention will now be described in detail in conjunction with the accompanying drawings.

FIG. 1 is a cross sectional view of a pneumatic tire according to the present invention.

FIGS. 2(a), 2(b) and 2(c) are schematic cross sectional views for explaining a tire manufacturing method according to the present invention.

FIGS. 3(a), 3(b) and 3(c) are schematic cross sectional views for explaining another tire manufacturing method according to the present invention.

Figure 6A:
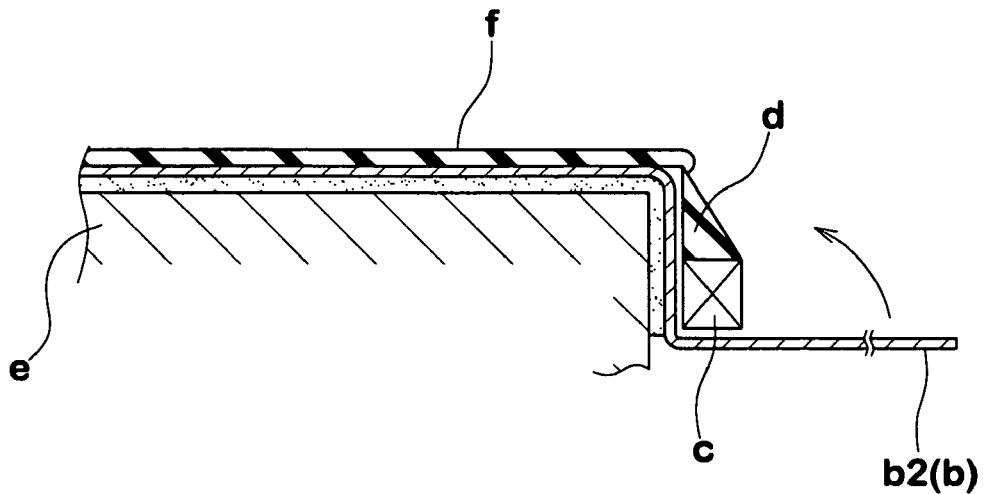
Figure 6B:
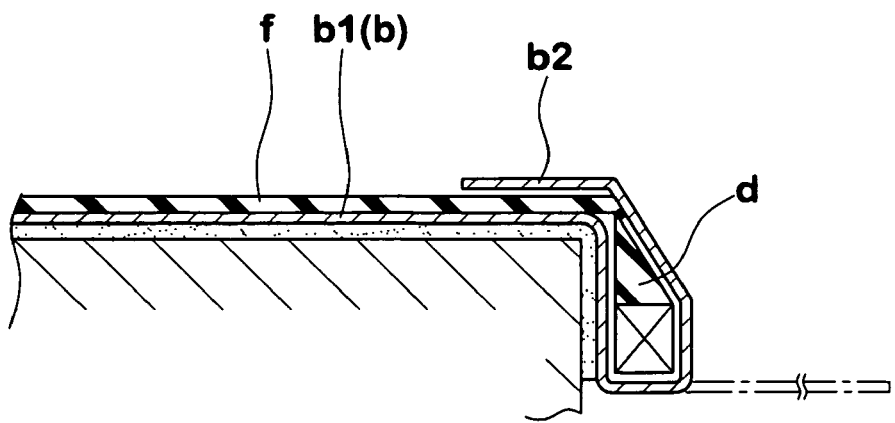

FIGS. 6(a) and 6(b) are schematic cross sectional views for explaining a prior art.

Figure 1:
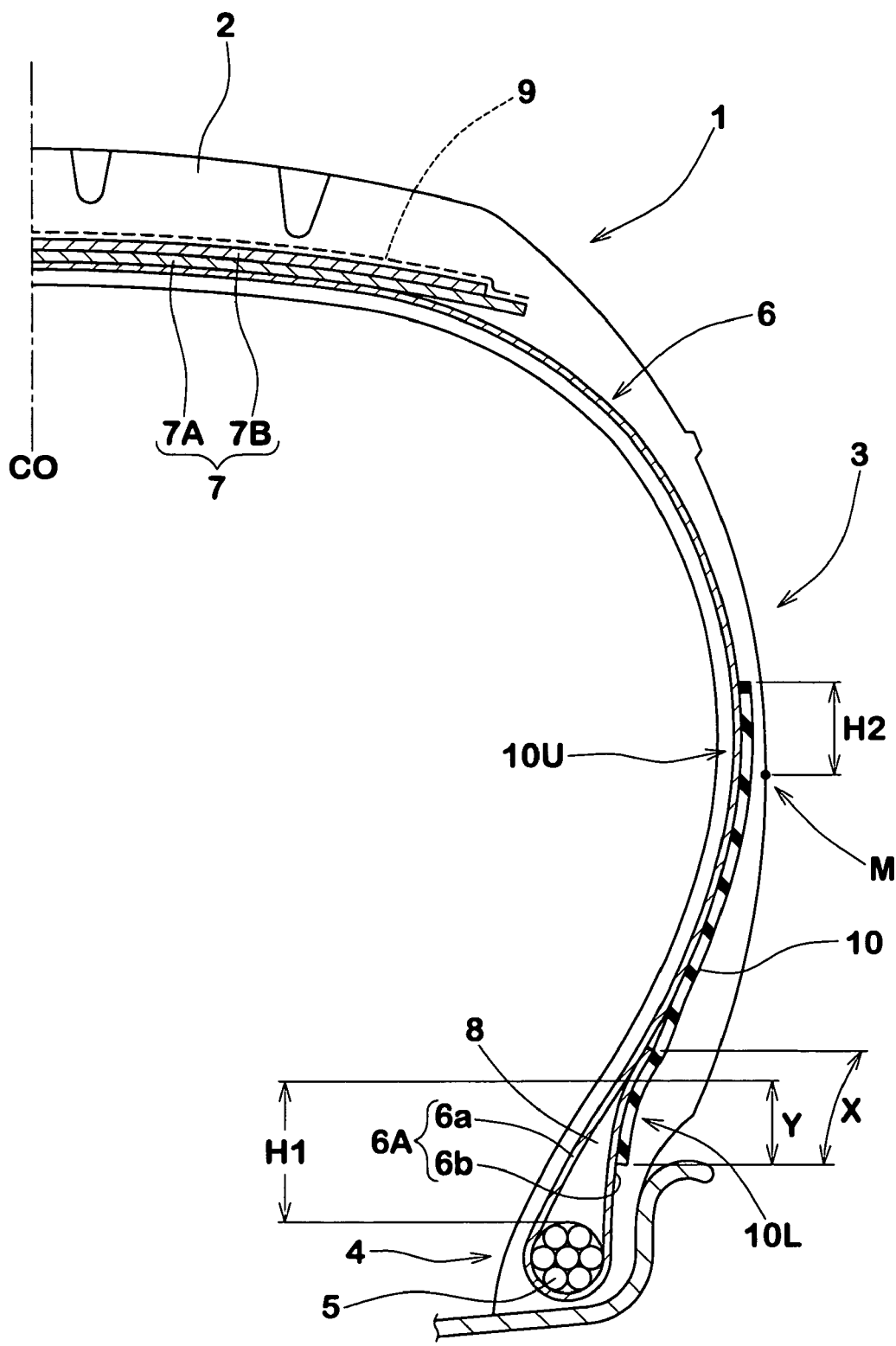

In the drawings, pneumatic tire 1 according to the present invention is a radial tire for passenger cars comprising a tread portion 2, a pair of sidewall portions 3, a pair of bead portions 4, a carcass 6 extending between the bead portions through the tread portion and sidewall portions 3, and a belt 7,9 disposed radially outside the crown portion of the carcass 6 in the tread portion 2. In FIG. 1, the above-mentioned normally inflated unloaded state is shown.

The bead portions 4 are each provided with a bead core 5. The bead core 5 is formed by winding a bead wire (for example steel wire) so that the windings make a ring with a specific cross-sectional shape (or arrangement). In this example, a single steel wire having a diameter of from 0.8 to 1.5 mm is wound into a circular cross sectional shape because a circular shape can decrease the axial width of the bead core, and as a result the volume of the bead portion 4 can be decreased to reduce the tire weight. Further, as another cord structure having a round cross-sectional shape, for example, so called cable bead formed by winding a sheathe wire or wires helically around an annular core wire can be used.

In the bead portion 4, further a bead apex 8 made of a hard rubber is disposed on the radially outside of the bead core 5. The bead apex 8 extends radially outwards from the bead core 5 and tapers radially outwardly so that the thickness becomes zero at its radially outer end. As shown in FIG. 1, the radial height H1 of the bead apex 8 measured between the radially outer end and the bead core 5 is decreased to within a range of from 10 to 25 mm. Thereby, it is possible to slim down the bead portion 4 to achieve both of the ride comfort and tire weight reduction.

The carcass 6 is composed of at least one ply 6A of cords arranged radially at an angle in the range of from 70 to 90 degrees with respect to the tire equator CO, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this embodiment, the carcass 6 is composed of a single ply 6A of cords arranged radially at 90 degrees with respect to the tire equator CO. For the carcass cords, organic fiber cords, e.g. polyester, nylon, rayon and the like can be suitably used.

The belt comprises a breaker 7 and optionally a band 9.

The breaker 7 comprises at least two cross plies 7A and 7B of high modulus cords laid at an angle of from 10 to 35 degrees with respect to the tire equator CO. For the breaker cords, steel cords and/or high modulus organic fiber cords such as polyethylene naphtarete(PEN), polyethylene tereph- thalate(PET) and aromatic polyamide can be used. In this example, the breaker consists of the two cross breaker plies 7A and 7B.

The band 9 is composed of a cord or cords wound on the radially outside of the breaker at a small angle of at most about 5 degrees, or almost zero degree with respect to the tire equator CO. For example, organic fiber cords such as nylon are used. In this example, the band 9 is a single full width nylon band covering the overall width of the breaker 7. However, a so called edge band made up of two parts covering the edge portions of the breaker only can be used alone or in combination with the full width band.

The above-mentioned bead apex 8 is disposed between the carcass main portion 6a and turnup portion 6b. The carcass ply turnup portion 6b extends radially outwardly along the axially outside of the bead apex 8, and then beyond the radially outer end of the bead apex, it extends along the axially outside of the carcass main portion 6a.

On the axially outside of the carcass 6, a reinforcing rubber layer 10 is disposed. This layer 10 is made of a hard rubber of which hardness is the same order as the bead apex such that the difference therebetween is less than 15 degrees in JIS type-A durometer hardness measured according to Japanese Industrial Standard K6253. The JIS type-A durometer hardness of the reinforcing rubber layer 10 is set in the range of from 75 to 95 degrees. In this example, the reinforcing rubber layer 10 has a substantially constant thickness of from 0.5 to 1.5 mm.

In order to provide a necessary steering stability without deteriorating ride comfort and weight reduction, the reinforcing rubber layer 10 extends radially outwardly beyond the maximum tire section width point M, and the radially outer end portion 10U terminates on the axially outside of the carcass main portion 6a at a radially height H2 of from 5 to 15 mm from the maximum tire section width point M.

On the other hand, the radially inner end portion 10L overlaps with the turnup portion 6b and terminates on the axially outside of the carcass turnup portion 6b. Further, the radially inner end portion 10L overlaps with the bead apex 8 in the radial direction.

The overlap Y of the radially inner end portion 10L with the bead apex 8 is set in the range of from 5 to 20 mm in the radial direction of the tire.

The overlap X of the radially inner end portion 10L with the turnup portion 6b is set in a range of not less than 5 mm along the layer 10.

Therefore, cooperating with the small bead apex 8, the reinforcing rubber layer 10 reinforce the bead portion and sidewall lower portion to thereby provide the necessary steering stability while achieving the ride comfort and effective weight reduction.

By setting the overlap Y as above, the rigidity variation from the radially inner end portion 10L to the bead apex 8 makes a smooth or gradual change. Further, as the radially outer edge of the turnup portion 6b is covered, failure such as separation can be effectively prevented.

If the hardness of the reinforcing rubber layer 10 is less than 75 degrees and/or the thickness is less than 0.5 mm, then the reinforcing becomes insufficient and it becomes difficult to improve the steering stability. If the hardness is more than 95 degrees and/or the thickness is more than 1.5 mm, then the ride comfort is liable to deteriorate.

If the overlap Y is less than 5 mm, the overlapped portion is liable to become weak, and it becomes difficult to improve the steering stability. The overlap Y of more than 20 mm is not preferable in view of tire weight reduction.

FIGS. 2(*a*)-2(*c*) show part of a method of manufacturing the pneumatic tire 1. In this example, the method comprises the following steps (s1)-(s9).

(s1) An inner liner rubber 21 is wound on a cylindrical surface 20c of a tire-building drum 20 such that both ends protrude from both edges of the cylindrical surface 20c.

(s2) A carcass ply 6A is wound on the inner liner rubber 21 around the cylindrical surface 20c so that both ends of the carcass ply 6A protrude from both edges of the cylindrical surface 20c, respectively, so as to be able to contract the protruding portion 23 radially inwards.

It is possible that the inner liner is integrated with a carcass ply. In such a case, the carcass ply can be wound directly on the cylindrical surface 20c, and the step (s1) is omitted.

(s3) Each of the protruding portions 23 is contracted so that the protruding portion 23 turns down along a radial surface 20s.

(s4) A bead-core-and-apex assembly 22 is as shown in FIG. 2(*b*) pressed against the axially outside of the turned-down protruding portion 23 from the side. At this moment, it is necessary that the upper end of the bead apex 8 is positioned at a height L1 of at most 8 mm, preferably less than 6 mm, more preferably less than 4 mm when measured radially outwardly from the cylindrical surface 20c of the tire-building drum 20.

Here, the bead-core-and-apex assembly 22 is formed by adhering a strip of bead apex rubber 8 around an annular bead core 5 and jointing the strip ends each other, wherein the thickness of the strip is gradually decreased to substantially zero at the radially outer end from the width or diameter of the bead core at the radially inner end. It is preferable that the thickness is decreased down to under about 6 mm more preferably under 4 mm in the bent portion.

(s5) Then, the protruding portion of the carcass ply 6A is turned up around the bead core assembly 22 from the axially inside to the axially outside onto the main portion 6a of the carcass ply 6A.

Figure 5:
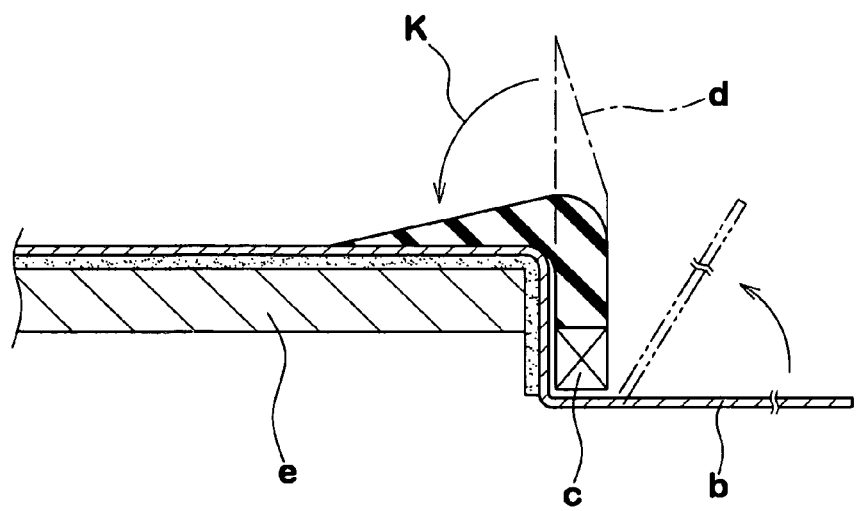
FIG. 5 is a schematic cross sectional view for explaining a problem involved in the use of a large-sized bead apex rubber in the above-mentioned tire manufacturing method.

At this moment, as the protrusion of the bead apex 8 from the cylindrical surface 20c is very small, it is not necessary to turn this protruding portion onto the carcass ply main portion 6a in advance. Thus, the conventional bending process (k) as show in FIG. 5 can be omitted. Even if a small protruding portion from the cylisndrical surface of the previously wound material exist, as the protrusion is very small, in the protruding portion which is bent together with the carcass ply protruding portion, the residual internal stress becomes negligibly small.

(s6) on the radially outside of the protruding portion 23 being turned on the carcass ply main portion 6a around the cylindrical surface 20c, the reinforcing rubber layer 10 is wound into a cylindrical shape so that the axially outer edge overlaps with the protruding portion 23 (or the carcass ply turnup portion 6b).

(s7) Then, sidewall rubber, bead rubber and the like are applied, and the assembly is shaped into a toroidal shape while decreasing the distance between the bead cores 5.

At this moment, as the reinforcing rubber layer 10 is disposed on the outside of the turnup portion 6b, the disarrangement of the cords of the main portion 6a and turnup portion 6b which occurs in the conventional structure shown in FIG. 6(b) during transforming of the cylindrical shape into a toroidal shape, can be effectively prevented, and uniformity is improved.

(s8) Then, to make a green tire, tread components including the belt (breaker 7, band 9) and a tread rubber are disposed around the crown portion of the toroidal carcass. The tread rubber and belt are preferably assembled into an annular body in advance.

(s9) The green tire is put in a mold and vulcanized.

Figure 2A:
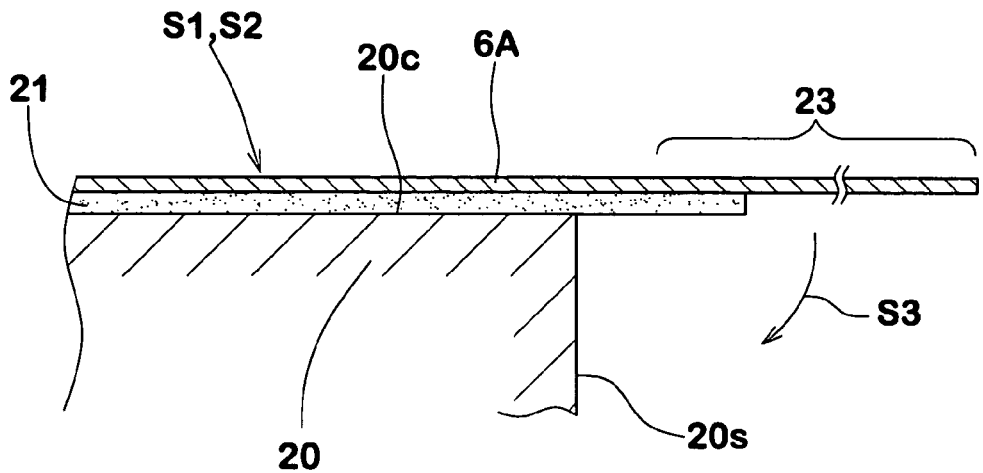
Figure 2B:
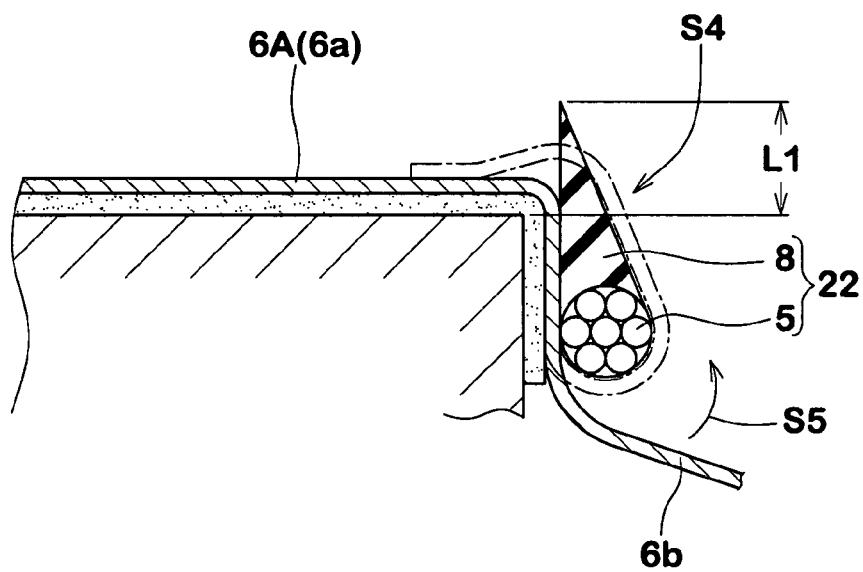
Figure 2C:
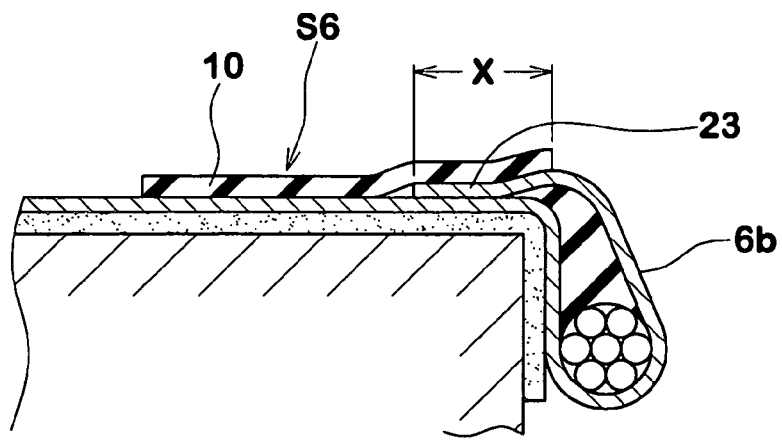
Figure 3A:
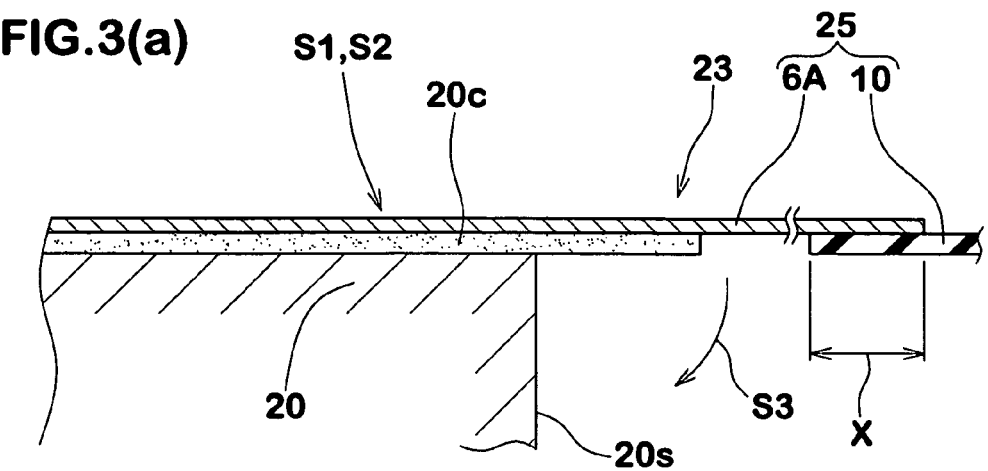
Figure 3B:
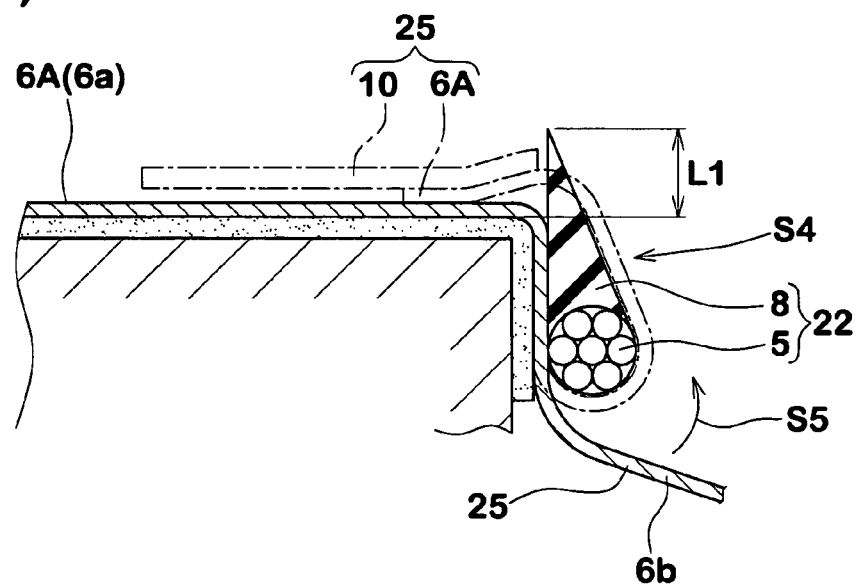
Figure 3C:
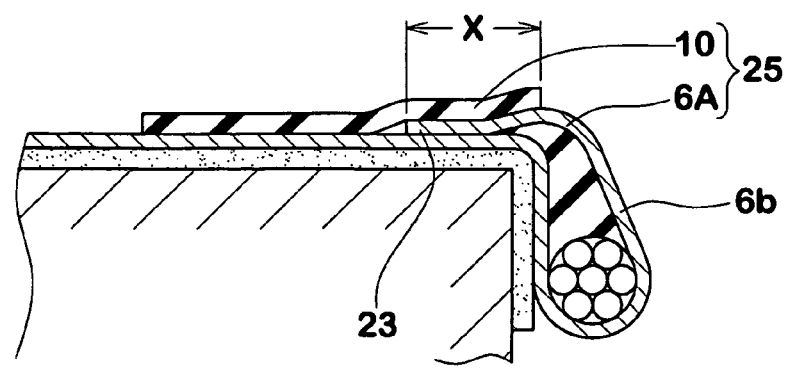
Figure 4:
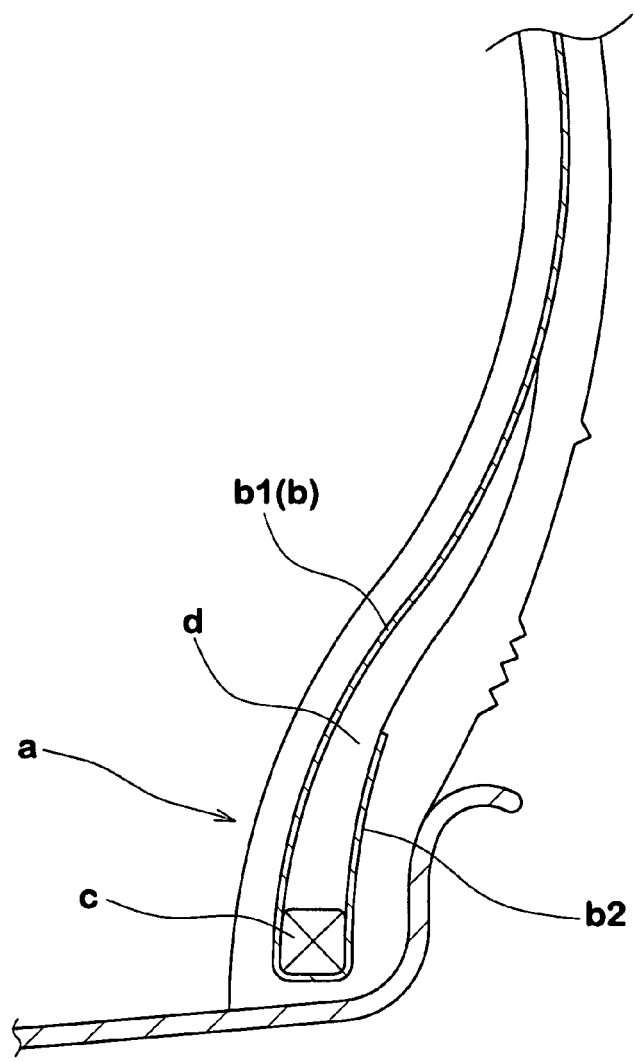
FIG. 4 is a schematic cross sectional view of a conventional structure.

FIGS. 3(a), 3(b) and 3(c) show another example of the part of the method shown in FIGS. 2(a)-2(c), wherein the step (s6) of winding the reinforcing rubber layer shown in FIG. 2(c) is committed. Only the differences from the former example will be described.

In this example, as shown in FIG. 3(a), at the time when the carcass ply 6A is wound into a cylindrical shape around the cylindrical surface 20c, the reinforcing rubber layer 10 is already adhered to the protruding edges of the carcass ply 6A.

The overlap therebetween, namely, the above-mentioned overlap X of the radially inner end portion 10L with the turnup portion 6b is set in a range of not less than 5 mm not to separate from each other during the following turning down step (FIG. 3(b)) and turning up step (FIG. 3(c)).

The protruding portion 23 inclusive of the reinforcing rubber layer 10 is turned down along a radial surface 20s as show in FIG. 3(b).

Then, in the same manner as the former example, the bead-core assembly 22 is pressed, and the protruding portion 23 is turned up around the bead core assembly 22 onto the main portion 6a of the carcass ply 6A together with the reinforcing rubber layer 10 as shown in FIG. 3(c).

Further, through the steps similar to the former example, the green tire is made, and vulcanized to the finished product.

Comparison Tests

According to the above-mentioned method including the latter example shown in FIGS. 3(a)-3(c), test tires of size 175/65R14 for passenger cars were made based on the specifications given in Table 1. The tires were tested for the steering stability and ride comfort. Also, the vertical spring constant and lateral spring constant of the tire were measured.

(1) Tire Spring Constant

A test tire mounted on a standard rim and inflated to 200 kPa was measured for vertical deflection during applying a vertical load of 4.0 kN, and the vertical spring constant was obtained as the quotient of the vertical load divided by the vertical deflection.

Under the vertical load of 4.0 kN, a lateral force of 500 N was further applied to the tire and the lateral deflection of the tire was measured, and the lateral spring constant was obtained as the quotient of the lateral force divided by the lateral deflection.

The spring constants are indicated in Table 1 by an index based on conventional tire being 100.

(2) Steering Stability and Ride Comfort

A 1500 cc FF passenger car provided on all the four wheels with test tires (tire pressure 200 kPa) was run on a dry tire test course, and the test driver evaluated steering stability and ride comfort. The results are indicated in Table 1 by an index based on conventional tire being 100. The larger the index, the better the performance.

From the test results, it was confirmed that although the tire weight is greatly decreased, a better or practically even steering stability can be obtained, and generally the ride comfort can be improved. Further, the deterioration in tire uniformity can be avoided.

TABLE 1

| Tire | Conv. | Ref. 1 | Ex. 1 | Ex. 2 | Ex. 3 | Ex. 4 | Ex. 5 | Ex. 6 | Ex. 7 |
|---|---|---|---|---|---|---|---|---|---|
| Bead core *1 | TB | SW | SW | SW | SW | SW | SW | SW | SW |
| Sectional shape | rectangle | round | round | round | round | round | round | round | round |
| Bead apex | | | | | | | | | |
| Hardness (deg.) | 92 | 92 | 92 | 92 | 92 | 92 | 92 | 92 | 92 |
| Height H1 (mm) | 40 | 15 | 15 | 15 | 15 | 15 | 15 | 15 | 25 |
| Reinforcing rubber layer | non | non | provided | provided | provided | provided | provided | provided | provided |
| Hardness (deg.) | — | — | 92 | 78 | 92 | 92 | 92 | 92 | 92 |
| Thickness (mm) | — | — | 0.8 | 0.8 | 0.8 | 1.2 | 0.8 | 0.8 | 0.8 |
| Height H2 (mm) | — | — | 12 | 12 | 12 | 12 | 5 | 5 | 5 |

TABLE 1-continued

| Tire | Conv. | Ref. 1 | Ex. 1 | Ex. 2 | Ex. 3 | Ex. 4 | Ex. 5 | Ex. 6 | Ex. 7 |
|---|---|---|---|---|---|---|---|---|---|
| Overlap Y (mm) | — | — | 10 | 10 | 20 | 10 | 5 | 20 | 10 |
| Tire weight (kg) | 6.8 | 5.9 | 6.2 | 6.2 | 6.3 | 6.4 | 6.1 | 6.3 | 6.2 |
| Spring constant | | | | | | | | | |
| Vertical | 100 | 85 | 97 | 95 | 100 | 103 | 95 | 100 | 95 |
| Lasteral | 100 | 85 | 98 | 96 | 100 | 103 | 97 | 100 | 96 |
| Steering stability | 100 | 90 | 103 | 98 | 103 | 105 | 102 | 102 | 98 |
| Ride comfort | 100 | 110 | 105 | 107 | 102 | 100 | 107 | 102 | 107 |

*1 SW: Windings of a single steel wire
TB: Tape bead consisting of steel wires

The invention claimed is:

1. A pneumatic fire comprising
a tread portion,
a pair of sidewall portions,
a pair of bead portions each with a bead core therein,
a carcass ply extending between the bead portions through the tread portion and sidewall portions, and turned up around the bead core in each of the bead portions from the inside to the outside of the tire so as to form a pair of turnup portions and a main portion therebetween,
a bead apex disposed between each said turnup portion and said main portion, and
a reinforcing rubber layer disposed axially outside said carcass ply, wherein
said bead apex extends radially outwardly from the bead core up to a position at a radial height in a range of from 10 to 25 mm from the radially outer end of the bead core,
said reinforcing rubber layer has a thickness in a range of from 0.5 to 1.5 mm and extends radially outwardly beyond the maximum tire section width point, and radially inwardly beyond the radially outer edge of the turnup portion so that the reinforcing rubber layer is positioned axially outside of the turnup portion and the radially outer end of the reinforcing rubber layer is positioned at a radial height of from 5 to 15 mm from the maximum tire section width point, and
the bead apex and reinforcing rubber layer are each made of a hard rubber, and the difference in JIS type-A hardness therebetween is not more than 15 degrees.

2. The pneumatic tire according to claim 1, wherein the JIS type-A hardness of the reinforcing rubber layer is in a range of from 75 to 95 degrees.

3. The pneumatic tire according to claim 1, wherein the reinforcing rubber layer overlaps with the radially outer end of the bead apex, and
the overlap (Y) therebetween is in a range of from 5 to 20 mm in the tire radial direction.

4. The pneumatic tire according to claim 1, wherein said bead core bas a round cross-sectional shape.

5. A method of manufacturing a pneumatic tire according to any one of claims 1 to 4, comprising:

winding the carcass ply around a cylindrical surface of a tire-building drum so that edge portions of the carcass ply protrude from the edges of the cylindrical surface;
placing a bead-core-and-apex assembly on each sides of the cylindrical surface, wherein the bead-core-and-apex assembly is made up of the annular bead core and the radially-extending annular bead apex rubber around the bead core, and the radially outer end of the bead apex rubber is positioned at a radial distance of not more than 8 mm from the cylindrical surface;
turning up the protruding edge portions of the carcass ply around the bead-core-and-apex assembly from the axially inside to the axially outside onto the carcass ply main portion wound around the tire-building drum; and
winding the reinforcing rubber layer around the main portion and each of the tuned-up edge portions of the carcass ply so that the reinforcing rubber layer overlaps with the tuned-up edge portion and the overlap therebetween is not less than 5 mm.

6. A method of manufacturing a pneumatic tire according to any one of claims 1 to 4, comprising:

winding the carcass ply around a cylindrical surface of a tire-building drum so that edge portions of the carcass ply protrude from the edges of the cylindrical surface, wherein the protruding edge portions of the carcass ply are each provided on the radially inner surface with the reinforcing rubber layer so that the reinforcing rubber layer overlaps at least 5 mm with the edge portion;
placing a bead-core-and-apex assembly on each sides of the cylindrical surface, wherein the bead-core-and-apex assembly is made up of the annular bead core and the radially-extending annular bead apex rubber around the bead core, and the radially outer end of the bead apex rubber is positioned at a radial distance of not more than 8 mm from the cylindrical surface; and
turning up the protruding edge portions of the carcass ply together with the reinforcing rubber layers, around the beadcore-and-apex assembly from the axially inside to the axially outside onto the carcass ply main portion wound around the tirebuilding drum.

* * * * *